US011281557B2

(12) United States Patent
Cao et al.

(10) Patent No.: US 11,281,557 B2
(45) Date of Patent: Mar. 22, 2022

(54) ESTIMATING TREATMENT EFFECT OF USER INTERFACE CHANGES USING A STATE-SPACE MODEL

(71) Applicant: Microsoft Technology Licensing, LLC, Redmond, WA (US)

(72) Inventors: Cheng Cao, Sammamish, WA (US); Bo Hyon Moon, Seattle, WA (US); Jayadev Pillai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 16/356,737

(22) Filed: Mar. 18, 2019

(65) Prior Publication Data
US 2020/0301805 A1 Sep. 24, 2020

(51) Int. Cl.
*G06F 11/34* (2006.01)
*G06F 9/451* (2018.01)
(Continued)

(52) U.S. Cl.
CPC .......... *G06F 11/3438* (2013.01); *G06F 9/451* (2018.02); *G06F 11/3447* (2013.01); *G06F 11/3452* (2013.01); *G06F 17/18* (2013.01); *G06N 3/0445* (2013.01); *G06N 7/005* (2013.01); *G06F 2201/865* (2013.01)

(58) Field of Classification Search
CPC .. G06F 11/3438; G06F 9/451; G06F 11/3692; G06F 11/3688; G06F 11/3452; G06F 17/18; G06F 11/3447; G06F 2201/865; G06N 3/0445; G06N 7/005
See application file for complete search history.

(56) References Cited

U.S. PATENT DOCUMENTS 6,904,408 B1 * 6/2005 McCarthy .............. G06Q 30/02
705/2
7,333,107 B2 2/2008 Papageorgiou
(Continued)

OTHER PUBLICATIONS

"International Search Report and Written Opinion Issued in PCT Application No. PCT/US2020/015751", dated Aug. 20, 2020, 11 Pages.

(Continued)

*Primary Examiner* — Yoshihisa Ishizuka
(74) *Attorney, Agent, or Firm* — Arent Fox LLP

(57) ABSTRACT

Examples described herein generally relate to a computer device including a memory, and at least one processor configured to evaluate a change to a user interface. The computer device monitor user interactions with the user interface prior to and after a change to the user interface. The monitoring includes collecting result metric data per user. The computer device divides users into a treated group and a control group based on whether each user engages in a particular interaction. The computer device generates a result metric time series for the treated group and a partitioned result metric time series for the control group. The computer device estimates a conditional distribution of the result metric and a counterfactual behavior using a Bayesian machine learning model based on the result metric time series. The computer device determines a treatment effect of the change to the user interface on the result metric data.

20 Claims, 6 Drawing Sheets

(51) Int. Cl.
    G06N 7/00      (2006.01)
    G06F 17/18     (2006.01)
    G06N 3/04      (2006.01)

(56) References Cited

U.S. PATENT DOCUMENTS

| | | | |
|---|---|---|---|
| 7,827,004 | B2 | 11/2010 | Chang et al. |
| 9,201,770 | B1 | 12/2015 | Duerk |
| 2002/0053078 | A1* | 5/2002 | Holtz .................. G11B 27/34 725/14 |
| 2002/0069119 | A1* | 6/2002 | Rogatinsky ........ G06Q 30/0621 705/14.4 |
| 2007/0052706 | A1 | 3/2007 | Martin |
| 2012/0011477 | A1* | 1/2012 | Sivadas .................. G06F 3/015 715/866 |
| 2014/0198965 | A1 | 7/2014 | Woods et al. |
| 2014/0278198 | A1 | 9/2014 | Lyon et al. |
| 2017/0148211 | A1 | 5/2017 | Zakhor et al. |
| 2019/0057104 | A1 | 2/2019 | Hassan |
| 2020/0106685 | A1 | 4/2020 | Basu et al. |

OTHER PUBLICATIONS

"Causality", Retrieved From: https://web.archive.org/web/20160406233447/http:/users.ox.ac.uk/~sfos0015/RD_lecture_3_2016.pdf, 26 Pages, Apr. 6, 2017.

Almirall, et al., "Subgroups Analysis when Treatment and Moderators are Time-varying", In Journal of Prevention Science, vol. 14, Issue 2, 16 Pages, Apr. 1, 2013.

Bojinov, et al., "Time Series Experiments and Causal Estimands: Exact Randomization Tests and Trading", In SSRN Electronic Journal, 42 Pages, Jun. 2017.

Brodersen, et al., "Inferring Causal Impact Using Bayesian Structural Time-Series Models", In Journal of Annals of Applied Statistics, vol. 9, No. 1, pp. 247-274, Mar. 2015.

Hirano, et al., "Efficient Estimation of Average Treatment Effects Using the Estimated Propensity Score", In Journal of the Econometric Society, vol. 71, Issue 4, pp. 1161-1189, Oct. 24, 2003.

Jorda, et al., "The Time for Austerity: Estimating the Average Treatment Effect of Fiscal Policy", In NBER Working Papers 19414, 37 Pages, Sep. 2013.

Sakaguchi, Shosei, "Estimation of Average Treatment Effects Using Panel Data when Treatment Effects are Heterogeneous by Unobserved Fixed Effects", In KIER Discussion Paper, 28 Pages, Apr. 3, 2017.

Cupec, Robert, "Detection of Local Reference Frames and Geometric Primitives Based on Planar Patches", In Publication of Technical Report ARP3D.IR4.11-B, Retrieved Date: Feb. 7, 2019, 13 Pages.

Fischer, et al., "Extracting Buildings from Aerial Images using Hierarchical Aggregation in 2D and 3D", In Journal of Computer Vision and Image Understanding, vol. 72, Issue 2, Nov. 1998, 30 Pages.

Fischler, et al., "Random Sample Consensus: A Paradigm for Model Fitting with Applications to Image Analysis and Automated Cartography", In Journal of Communications of the ACM, vol. 24, Issue 6, Jun. 1981, pp. 381-395.

Gerstweiler, et al., "Extraction of Structural and Semantic Data from 2D Floor Plans for Interactive and Immersive VR Real Estate Exploration", In Journal of Technologies, vol. 6, Issue 4, Nov. 4, 2018, 27 Pages.

Kazhdan, et al., "Poisson Surface Reconstruction", In Proceedings of the Fourth Eurographics Symposium on Geometry Processing, Jun. 26, 2006, 10 Pages.

Klein, et al., "Parallel Tracking and Mapping for Small AR Workspaces", In Proceedings of the 6th IEEE and ACM International Symposium on Mixed and Augmented Reality, Nov. 13, 2007, 10 Pages.

Liu, et al., "PlaneRCNN: 3D Plane Detection and Reconstruction from a Single Image", In Journal of Computing Research Repository, Dec. 10, 2018, pp. 4450-4459.

Lorensen, et al., "Marching Cubes: A High Resolution 3D Surface Construction Algorithm", In Proceedings of the ACM SIGGRAPH Computer Graphics, vol. 21, Issue 4, Jul. 1987, pp. 163-169.

Lu, et al., "Volume Decomposition and Feature Recognition Hexahedral Mesh Generation", In Proceedings of the 8th International Meshing Roundtable, Sep. 27, 1999, 14 Pages.

Newcombe, et al., "KinectFusion: Real-Time Dense Surface Mapping and Tracking", In Proceedings of 10th IEEE International symposium on Mixed and augmented reality, Oct. 26, 2011, 10 Pages.

* cited by examiner

ESTIMATING TREATMENT EFFECT OF USER INTERFACE CHANGES USING A STATE-SPACE MODEL

BACKGROUND

The present disclosure relates to user interfaces for computers, and more particularly to measuring the effects of changes to a user interface.

Designers of a user interface may seek to include features with which users are likely to interact and perform desired actions. Designers may receive anecdotal feedback from test groups or end users. Such feedback may provide some guidance, but is limited in scope. Moreover, user interactions with a user interface may vary across different groups and vary over time. Further, due to the numerous factors affecting user interactions with a user interface, it may be difficult to determine how much a change is responsible for changed user activity. Accordingly, user interface designers may not have reliable systems to provide data driven decisions with respect to user interface changes.

Thus, there is a need in the art for improvements in user interfaces. In particular, there is a need for systems and method for evaluating changes to a user interface.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a computer device for evaluating a user interface. The computer device may include a memory and a processing system comprising at least one processor communicatively coupled with the memory. The processing system may monitor user interactions with a user interface prior to and after a change to the user interface, the monitoring including collecting result metric data per user as a time series. The processing system may divide users into a treated group that engaged in a particular interaction with an element of the user interface after the change and a control group that did not engage in the particular interaction. The processing system may generate a result metric time series for the treated group based on the result metric data. The processing system may generate a partitioned result metric time series for the control group based on the result metric data. The processing system may estimate a conditional distribution of the result metric and a counterfactual behavior using a Bayesian machine learning model based on the result metric time series for the treated group and the partitioned result metric time series for the control group. The processing system may determine a treatment effect of the change to the user interface on the result metric data based on the conditional distribution and the counterfactual behavior. The processing system may update the user interface to keep or remove the change to the user interface based on the treatment effect of the change.

In another example, the disclosure provides a method of estimating change in user behavior due to user interface enhancements. The method may include monitoring user interactions with a user interface prior to and after a change to the user interface, the monitoring including collecting result metric data per user as a time series. The method may include dividing users into a treated group that engaged in a particular interaction with an element of the user interface after the change and a control group that did not engage in the particular interaction. The method may include generating a result metric time series for the treated group based on the result metric data. The method may include generating a partitioned result metric time series for the control group based on the result metric data. The method may include estimating a conditional distribution of the result metric and a counterfactual behavior using a Bayesian machine learning model based on the result metric time series for the treated group and the partitioned result metric time series for the control group. The method may include determining a treatment effect of the change to the user interface on the result metric data based on the conditional distribution and the counterfactual behavior.

As another example, the disclosure provides a computer-readable medium storing computer-executable code for evaluating a change to a user interface. The computer-readable medium may include code to monitor user interactions with the user interface prior to and after a change to the user interface, the monitoring including collecting result metric data per user as a time series. The computer-readable medium may include code to divide users into a treated group that engaged in a particular interaction with an element of the user interface after the change and a control group that did not engage in the particular interaction. The computer-readable medium may include code to generate a result metric time series for the treated group based on the result metric data. The computer-readable medium may include code to generate a partitioned result metric time series for the control group based on the result metric data. The computer-readable medium may include code to estimate a conditional distribution of the result metric and a counterfactual behavior using a Bayesian machine learning model based on the result metric time series for the treated group and the partitioned result metric time series for the control group. The computer-readable medium may include code to determine a treatment effect of the change to the user interface on the result metric data based on the conditional distribution and the counterfactual behavior.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for estimating a treatment effect of a user interface change. The disclosure provides techniques that allow a computer system provider (e.g., a website operator) to utilize customer data to measure an effect that a change to the user interface has on user behavior. A result metric may refer to a measured property of user behavior such as spending, viewing time, number of views, number of clicks, number of engagements, or other desirable activity.

A randomized controlled trial may be difficult to implement regarding user interfaces and user behavior. For example, users may be aware of user interface changes, which may affect their behavior. Additionally, deploying different user interfaces to a control group and an experimental group may pose logistical and customer relationship issues. Instead, data regarding user interface changes may only be available for a relatively short period before the user interface change and for a period after the user interface change. Accordingly, it would be desirable to measure the effect of a user interface change based on the available data.

In an example, the present disclosure provides a system and methods for estimating a change in user behavior due to a change to a user interface. The system monitors user interactions with the user interface before and after the change to the user interface. In particular, the system collects interaction details and a result metric on a per user basis. The system then aggregates the collected information for a treatment group that interacts with a new feature of the user interface and a control group that does not interact with the new feature. The system generates a time series of result metrics for each group or partition thereof. The system then trains a Bayesian machine learning model based on the time series of result metrics to estimate a conditional distribution of the result metric and a counterfactual behavior. The counterfactual behavior may represent predicted behavior of the treated group after at time of the change to the user interface if the change had not occurred. The system then estimates an effect of the change to the user interface based on the time series of the result group and the counterfactual behavior.

Figure 1:
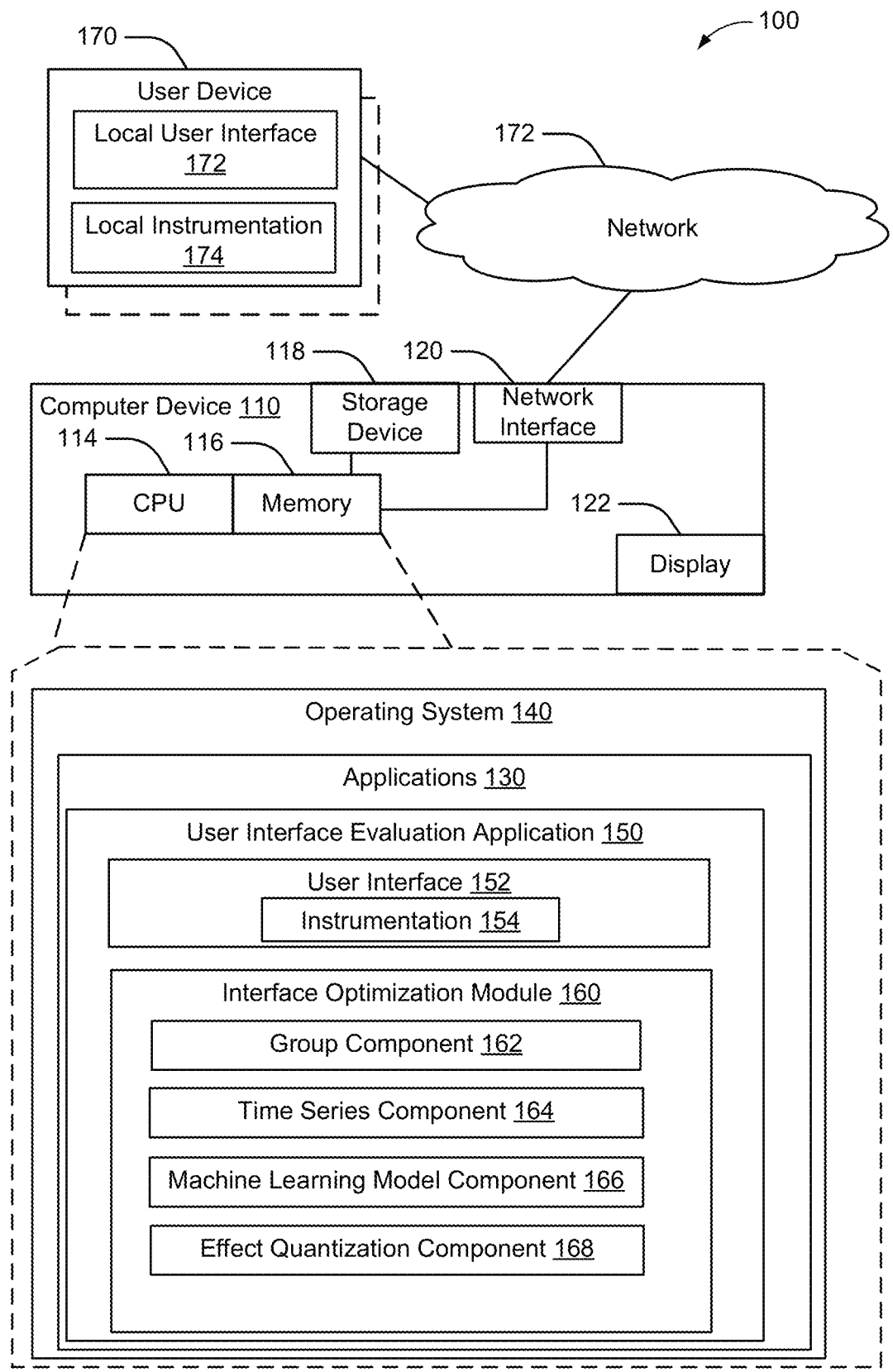
FIG. 1 is a diagram of an example computer system for providing and evaluating a user interface, in accordance with an implementation of the present disclosure.

Referring now to FIG. 1, an example user interface system 100 includes a central computer device 110 and a plurality of user devices 170. The central computer device 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing user interface data.

The computer device 110 may include a central processing unit (CPU) 114 that executes instructions stored in memory 116. For example, the CPU 114 may execute an operating system 140 and one or more applications 130, which may include a user interface evaluation application 150. The computer device 110 may also include a network interface 120 for communication with external devices via a network. For example, the computer device 110 may communicate with a plurality of user devices 170.

The computer device 110 may include a display 122. The display 122 may be, for example, a computer monitor or a touch-screen. The display 122 may provide information to an operator and allow the operator to configure the computer device 110.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include a storage device, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The applications 130 may include a user interface evaluation application 150 configured to evaluate an impact of changes to the user interface on behavior of a user. The user interface evaluation application 150 may publish a user interface 152, or may be in communication with or otherwise operate in conjunction with a published user interface 152. The user interface 152 may be any user interface with which an end user may interact. For example, the user interface 152 may be an application or operating system that runs on the user devices 170. The user interface evaluation application 150 may be associated or in communication with an online store or update service. Accordingly, the user interface evaluation application 150 may occasionally publish an updated version of the user interface 152 that may include changes to the user interface 152. As another example, the user interface 152 may be a web-page that is accessed through a browser application executed on the user devices 170. By loading the web-page, the browser application may effectively operate as a user interface for an application executed on the computer device 110 (e.g., in the case of a web server).

In an implementation, the user interface 152 may include monitoring instrumentation 154 for monitoring a user interaction with the user interface 152. The monitoring instrumentation 154 may collect data regarding the user interactions and provide the collected data to the user interface evaluation application 150. For example, the monitoring instrumentation 154 may track when the user is exposed to the changed feature of the user interface 152 and any user interactions (e.g., clicks, hovers, scrolls) with the new feature or in response to the new feature. The monitoring instrumentation 154 may also determine a date and an interaction amount for each user interaction. The interaction amount may be a measure of a response metric. For example, on the user interface 152 configured for facilitating sales, the interaction amount may be a purchase amount or more generically, revenue. Other possible interaction amounts include number of clicks, an interaction time, transactions, or a number of notices, promotions, announcements, or advertisements displayed.

In an aspect, for example where the user interface 152 is a website, the monitoring instrumentation 154 may be provided as a software development kit (SDK) for providing tools that may be added to the website. An operator may host the website and monitoring instrumentation 154 on one or more enterprise servers or cloud servers (e.g., computer device 110). The monitoring instrumentation 154 may provide the website with capability to monitor a customer's interaction with the website and generate transaction contextual data for a session (e.g., user interaction with the website) leading to a transaction. In an implementation, the transaction contextual data may include a device fingerprint identifying a hardware device (or virtual device) used to make a transaction. The device fingerprint may be a fuzzy identification of a user device that may be applicable across multiple sessions and properties (e.g., websites). The fuzzy identification may not require any specific piece of identification, but instead may be based on a set of available information. The available information may be hashed according to a defined algorithm to generate the device fingerprint such that when the set of available information is used for another transaction, the device can be identified. For example, the device fingerprint may be used as a user identifier to uniquely identify a user.

The user interface evaluation application 150 may include an interface optimization module 160 that determines the effect of a change to the user interface and may determine whether to keep or remove the change based on the determined effect. The interface optimization module 160 may include a group component 162 that divides users or data associated with users into a control group and a treatment group based on interaction with a feature of the user interface. The interface optimization module 160 may include a time series component 164 that generates one or more time series of result metrics for the control group and the treatment group. The time series component 164 may also apply filters to exclude various outliers of the result metric. The interface optimization module 160 may include a machine learning model component 166 that may train a machine learning model based on the time series of the result metric and estimate a conditional distribution of the result metric and a counterfactual behavior for the treatment group using the trained machine learning model. The interface optimization module 160 may include an effect quantization component 168 that may determine a treatment effect of the change to the user interface. The treatment effect may be based on the conditional distribution and the counterfactual behavior. The interface optimization module 160 may also determine whether to keep or remove the change to the user interface based on the treatment effect. For example, the interface optimization module 160 may keep changes that result in a positive treatment effect and remove changes that result in a negative treatment effect.

Figure 2:
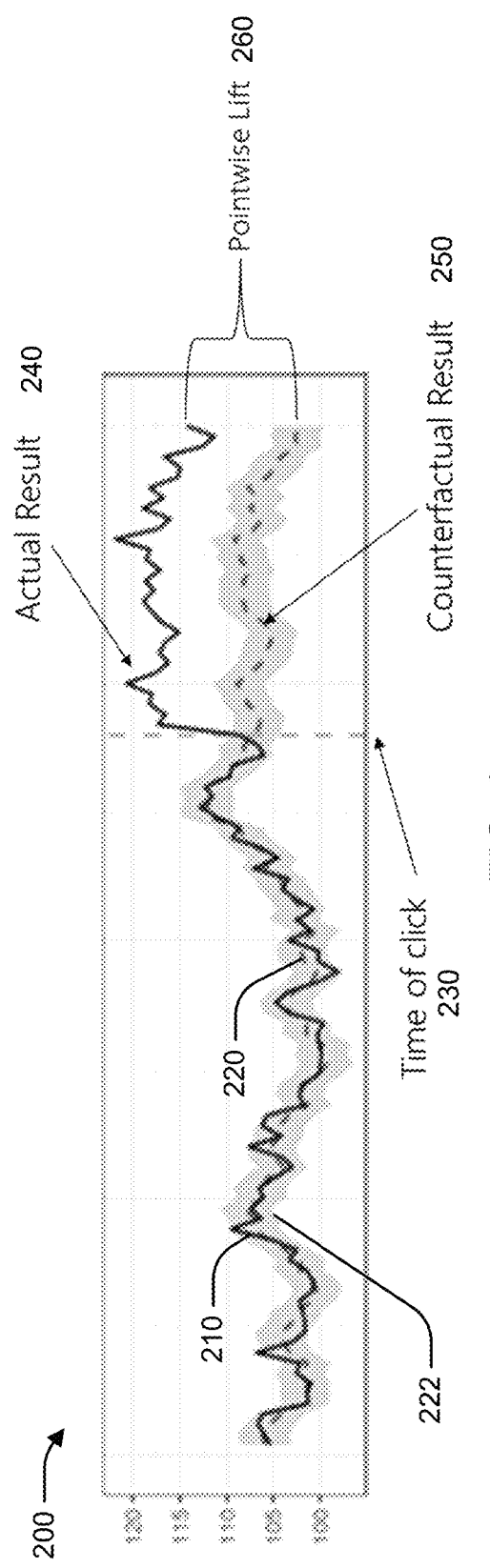
FIG. 2 is a chart illustrating an example change in user behavior due to a change in a user interface, in accordance with an implementation of the present disclosure.

FIG. 2 is a chart 200 including example time series for a user response metric for a control group and a treatment group. In the illustrated example, a change in a user interface may result in a positive effect (i.e., a pointwise lift). The time series for the treatment group 210 is illustrated as a solid line, while the time series for the control group 220 is illustrated as a dashed line. A shaded region 222 may represent a range for the time series for the control group 220. Generally, the time series for the treatment group 210 and the time series for the control group 220 may follow similar patterns prior to the change in the user interface or an interaction with the changed user interface. For example, a time 230 of a first click may indicate when users in the treatment group interact with the change to the user interface. After the change, the time series for the treatment group 210 may indicate an observed result metric (e.g., actual revenue 240). The time series for the control group 220 may be used to predict (e.g., using the machine learning model component 166) a counterfactual behavior (e.g., counterfactual revenue 250) of the treatment group. The counterfactual behavior may represent predicted behavior of the treated group after at time of the change to the user interface if the change had not occurred. A difference between the observed result metric and the counterfactual behavior may be referred to as a treatment effect or pointwise lift 260.

Figure 3:
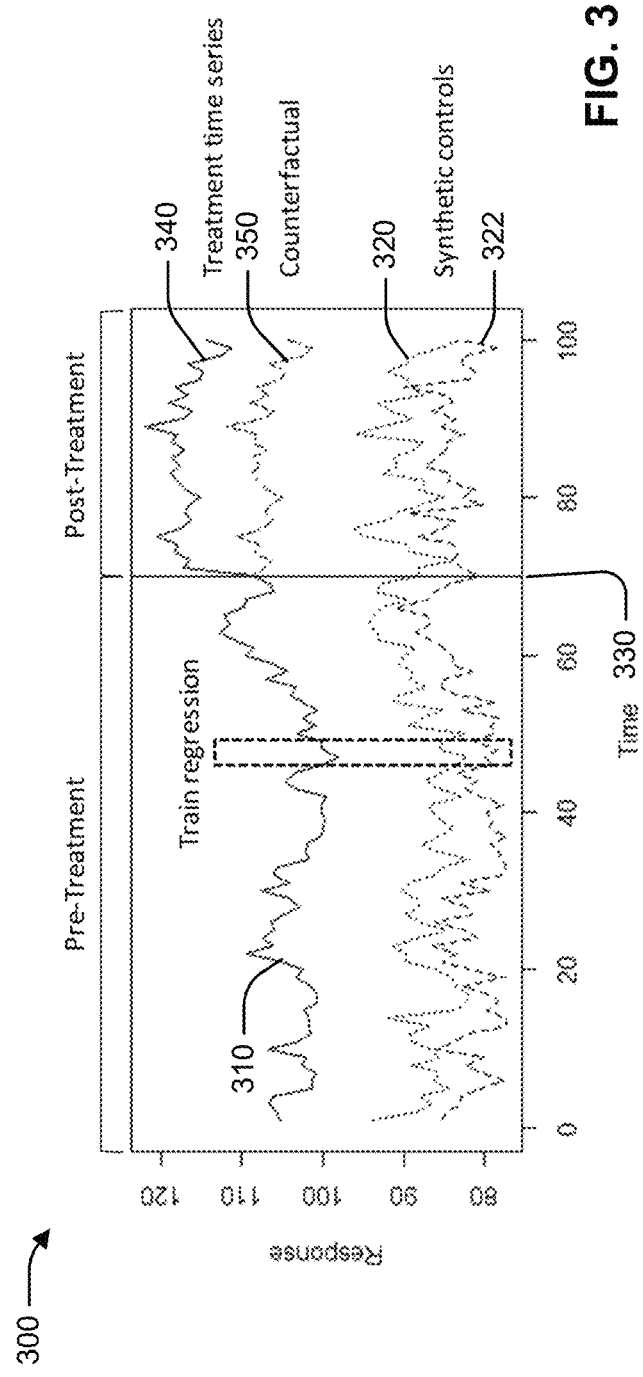
FIG. 3 is another chart illustrating another example change in user behavior due to a change in a user interface, in accordance with an implementation of the present disclosure.

FIG. 3 is another chart including example time series for a user response metric for a treatment group and synthetic controls. In the illustrated example, a change in a user interface may result in a positive effect (i.e., a pointwise lift). The time series for the treatment group 310 is illustrated as a solid line. The time series for the synthetic controls 320, 322 are illustrated as a dashed lines. The time series for the synthetic controls 320, 322 may be selected based on similarities to the time series for the treatment group 310. As discussed in further detail below, partitions of a control group may be used to generate synthetic controls. A regression or other machine learning model may be trained based on the time series for the treatment group 310 and the synthetic controls to predict the counterfactual behavior 350, which may be compared with the treatment time series 340 after the time 330 of the change to the interface to determine the treatment effect.

Figure 4:
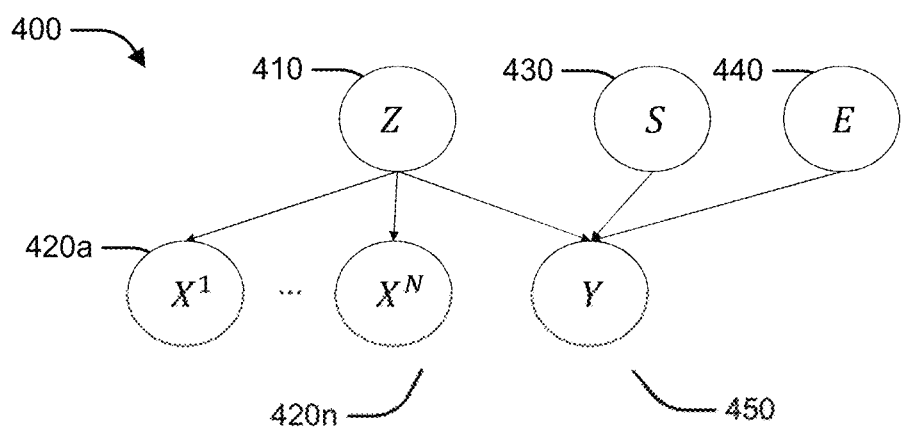
FIG. 4 is a conceptual diagram of a first example machine learning model, in accordance with an implementation of the present disclosure.

Turning to FIG. 4, an example model 400 shows inputs that may affect a treatment effect of a user interface. The model 400 may be a latent state model. The model 400 may assume that all time series 420a-420n for a result metric map to a latent state Z 410. Post-treatment result Y 450 for the treatment group may also be assumed to map to the latent state Z 410. Accordingly, the model 400 may infer the latent state Z 410 from the known times series 420a-420n (e.g., the treatment group time series and the partitioned control group time series). The latent state Z 410 may be trained to correctly predict the post-treatment result Y 450. Additionally, a seasonal component 430 may contribute to the post-treatment result Y 450. Finally, the treatment effect E 440 may contribute to the post-treatment result Y 450. In an implementation, it may also be assumed that the treatment effect E 440 on post-treatment result Y is slow-varying. Therefore, by training the model 400 to correctly predict Y (based on the known post-treatment results), the trained model 400 may provide the treatment effect E 440. For example, the model 400 may be sampled using Monte Carlo Markov chain (MCMC) sampling to estimate parameters to obtain a posterior predictive distribution.

Figure 5:
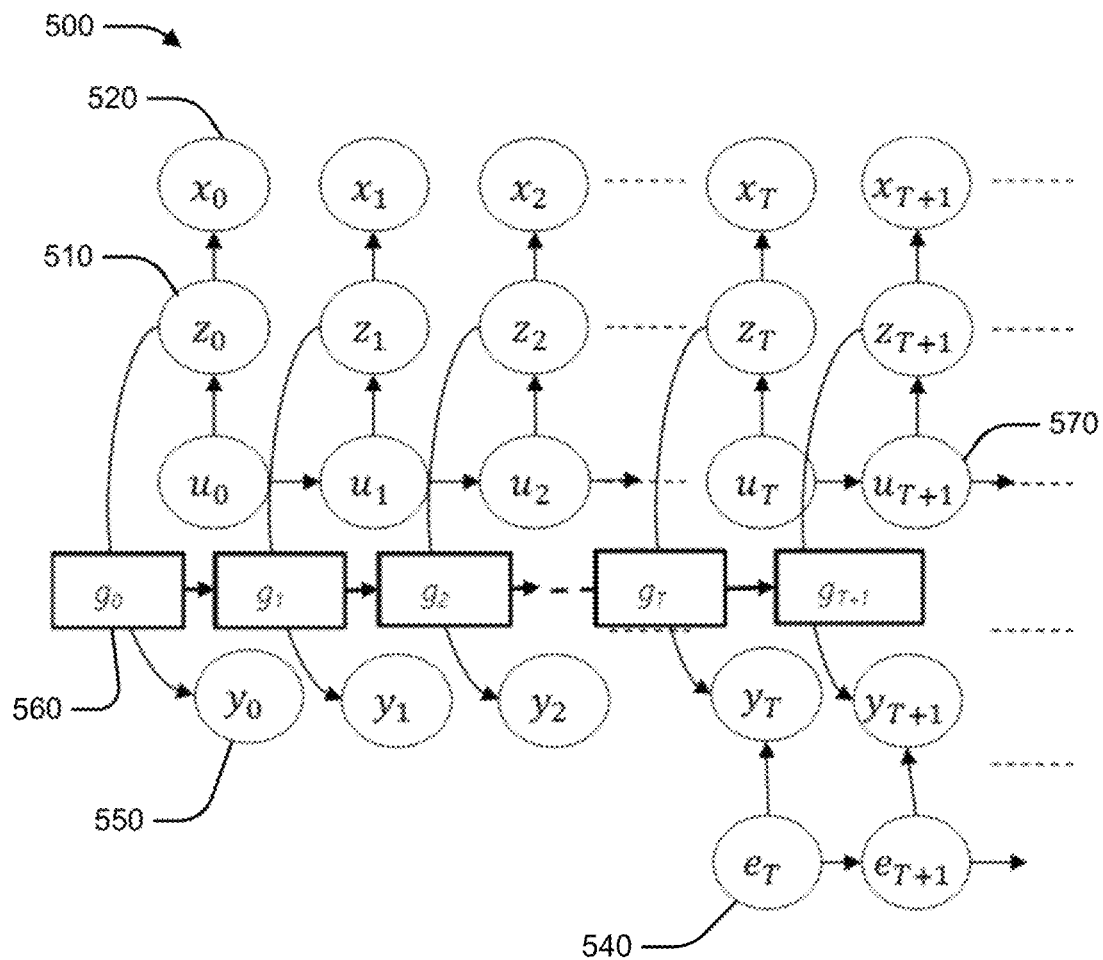
FIG. 5 is a conceptual diagram of a second example machine learning model, in accordance with an implementation of the present disclosure.

Turning to FIG. 5, a more detailed example model 500 shows how several factors are assumed to contribute to a causal effect in a slow wave pattern. The following assumptions may form a basis for the model 500.

$$y(t) = \beta_y * z(t) + \beta_s * s(t) + \epsilon_y(t) + b \quad \text{for } t \leq T \text{ and } g(t) = 1 \, y(t) =$$
$$\beta_y * z(t) + \beta_s * s(t) + e(t) + \epsilon_y(t) + b \quad \text{for } t > T \text{ and } g(t) = 1$$
$$P(y(t)) = \alpha_{noise} \quad \text{for } g(T) = 0$$
$$x(t) = \beta_x * z(t) + \epsilon_x(t)$$
$$e(t) = e(t-1) + \epsilon_e(t) \quad \text{for } t > T$$
$$z(t) = u(t) + \epsilon_z(t) \quad \forall t \geq 0$$
$$u(t) = u(t-1) + \epsilon_u(t)$$

Where $$\epsilon_x(t) \sim N(0, Is_x^{-1}), \epsilon_y(t) \sim N(0, s_y^{-1}), \epsilon_u(t) \sim N(0, s_u^{-1}), \epsilon_e(t) \sim N(0, s_e^{-1}),$$

$$\epsilon_z(t) \sim N(0, I),$$

$$s_x \sim G(k_x, v_x), s_y \sim G(k_y, v_y), s_u \sim G(k_u, v_u), s_e \sim G(k_e, v_e),$$

$$\beta_x \sim N(0,1), \beta_y \sim N(0,1), \beta_s \sim N(0, s_s^{-1}),$$

$$s_s \sim G(k_s, v_s), \text{ and } b \sim N(0,1)$$

Using MCMC sampling, the conditional distribution of the treatment effect can be estimated as p(e_(T:T_all)|y_(1: T_all), x_(1:T_all)). In particular, the machine learning model component 166 may sample pre-treatment data and post-treatment data to estimate the coefficients of a linear regression model that predicts x(t) and y(t) based on the latent state z(t). The machine learning model component 166 may directly add an treatment effect component 540 into the model 500 after the treatment (T) to account for the effect of the treatment to the observed response y.

As depicted, FIG. 5, a state component Z(t) generates x(t), the referring time series 520 and y(t), the observed response 550 of the treatment group. In addition, the prior bias 570 of Z(t) may be modeled as a random walk process u(t). An important component of the model 500 is the average treatment effect e(t) component 540 which is modeled as a random walk starting from the treatment. A gate signal g(t) 560 is applied.

If g(t)=1:

$$y(t) = \beta_y * z(t) + \beta_s * s(t) + \epsilon_y(t) + b \text{ for } t \leq T$$

$$y(t) = \beta_y * z(t) + \beta_s * s(t) + e(t) + \epsilon_y(t) + b \text{ for } t > T$$

$$x(t) = \beta_x * z(t) + \epsilon_x(t)$$

If g(t)=0:

$$P(y(t)) = \alpha_{noise}$$

$$e(t) = e(t-1) + \epsilon_e(t) \text{ for } t > T$$

$$z(t) = u(t) + \epsilon_z(t) \, \forall t \geq 0$$

$$u(t) = u(t-1) + \epsilon_u(t)$$

$$\epsilon_x(t) \sim N(0, I * s_x^{-1}), s_x \sim G(k_x, v_x)$$

$$\epsilon_y(t) \sim N(0, s_y^{-1}), s_y \sim G(k_y, v_y)$$

$$\epsilon_u(t) \sim N(0, s_u^{-1}), s_u \sim G(k_u, v_u)$$

$$\epsilon_e(t) \sim N(0, s_e^{-1}), s_e \sim G(k_e, v_e)$$

$$\epsilon_z(t) \sim N(0, I)$$

$$\beta_x \sim N(0,1), \beta_y \sim N(0,1), \beta_s \sim N(0, s_s^{-1})$$

$$s_s \sim G(k_s, v_s),$$

$$b \sim N(0,1)$$

To estimate the posterior distribution of treatment effects e=[e(T), e(T+1) . . . e($T_{total}$)], the machine learning model component 166 may use, for example, Gibbs sampling (an example of MCMC sampling) to sample the joint posterior distribution of all hidden components and model parameters to get a marginal distribution of e.

With respect to sampling z(t), based on the model 500, z(t) is only conditioned on u(t), x(t) and y(t) for all t that g(t)=1, $p(z(t)|\theta^z) \propto p(z(t)|u(t))*p(x(t)|z(t))*p(y(t)|z(t))$.

According to the conjugation:

$$p(z(t)|\theta^z) \sim N(m_z(t), P_z(t))$$

$$P_z(t) = (I + \beta_x^T \beta_x * s_x + \beta_y^T \beta_y * s_y * \gamma_{mix})^{-1}$$

$$m_z(t) = m_{uz}(t) + m_{yz}(t) * \gamma_{mix} + m_{xz}(t)$$

$$m_{uz}(t) = P_z(t) * u(t)$$

$$m_{xz}(t) = P_z(t) * \beta_x^T * x * s_x$$

$$m_{yz}(t) = P_z(t) * \beta_y^T * y_c(t) * s_y$$

$$y_c(t) = y(t) - \beta_s * s(t) - b \text{ for } t \leq T$$

$$y_c(t) = y(t) - \beta_s * s(t) - b - e(t) \text{ for } t > T \quad [6]$$

In the above conjugation, $\gamma_{mix}$ controls how samples of y(t) can affect the posterior estimate of z(t). The reason to introduce a hyperparameter to the formal Bayesian Inference equation is that if the predictor z(t) is heavily effected by y(t), the model will tend to use less information from covariates time series x and seasonality component s to estimate counterfactual response part of y(t). An empirical value for $\gamma_{mix}$ is 0.05.

With respect to u(t), machine learning model component 166 may define U(t)=[u(0), u(1) . . . u(t)] and Z(t)=[z(0), z(1) . . . z(t)]. The machine learning model component 166 may sample U($T_{total}$) given Z($T_{total}$) and gate signals G(t)= [g(0), g(1) . . . g(t)] as follows: 1) Get $m_u(t|t)$, $P_u(t|t)$ using results from Kalman Filter.

For g(t)=1:

$$S(t) = I + P_u(t|t-1)$$

$$K(t) = P_u(t|t-1) S(t)^{-1}$$

$$m_u(t|t) = m_u(t|t-1) + K(t) * (z(t) - m_u(t|t-1))$$

$$P_u(t|t) = (I - K(t)) P_u(t|t-1)$$

$$P_u(t+1|t) = P_u(t|t) + I * s_u^{-1}$$

$$m_u(t+1|t) = m_u(t|t)$$

For g(t)=0: The Kalman filter is not corrected from the current data point:

$$P_u(t|t) = P_u(t|t-1)$$

$$m_u(t|t) = m_u(t|t-1)$$

$$P_u(t+1|t) = P_u(t|t) + I * s_u^{-1}$$

$$m_u(t+1|t) = m_u(t|t)$$

2) Sample $u(T_{total}) \sim N(m_u(T_{total}|T_{total}), P_u(T_{total}|T_{total})$
For $t=T_{total}-1, \ldots, 0$:
Use $m_u(t|t)$, $P_u(t|t)$ to calculate $\widetilde{m_u}(t|t)$, $\widetilde{P_u}(t|t)$:

$$\widetilde{P_u}(t|t) = (P_u(t|t)^{-1} + I * s_u)^{-1} \quad\quad 5$$

$$\widetilde{m_u}(t|t) = \widetilde{P_u}(t|t) * (P_u(t|t)^{-1} * m_u(t|t) + u(t+1) * s_u)$$

Sample $u(t) \sim N(\widetilde{m_u}(t|t), \widetilde{P_u}(t|t))$

The machine learning model component 166 may sample the regression model parameters $\beta_x$, $\beta_y$, $\beta_s$ and b based on the samples when $g(t)=1$. For $\beta_x$, the machine learning model component 166 may define $z=[z(0), z(1) \ldots z(T_{total})]$, $x_c=[x(0)-\beta_s*s(0), x(1)-\beta_s*s(1), \ldots x(T_{total})-\beta_s*s(T_{total})]$, $p(\beta_x|\theta^{\beta_x}) \propto p(x_c|\beta_x, z) * p(\beta_x)$.
According to conjugation:

$$p(\beta_x|\theta^{\beta_x}) \sim N(m_{\beta_x}, P_{\beta_x}):$$

$$P_{\beta_x} = \left(n_{normalzied} * \frac{zz^T}{n_{sample}} * s_x + I\right)^{-1}$$

$$m_{\beta_x} = P_{\beta_x} * P_{zx} * s_x$$

$$P_{zx} = n_{normalzied} * \frac{z * y_c^T}{n_{sample}}$$

The machine learning model component 166 may normalize $zz^T$ by $n_{normalzied}/n_{sample}$ to avoid numeric overflow for long period data, an empirical choice of value for $n_{normalzied}$ is 100.

For $\beta_y$, the machine learning model component 166 may define $z=[z(0), z(1) \ldots z(T_{total})]$, $y^z_c=[y^z_c(0), y^z_c(1) \ldots y^z_c(T_{total})]$, and $y^z_c(t)$ as follows:

$$y^z_c(t)=y(t)-\beta_s*s(t)-b \text{ for } t<T$$

$$y^z_c(t)=y(t)-\beta_s*s(t)-b-e(t) \text{ for } t \geq T \quad\quad [10]$$

The posterior conditional distribution of $\beta_y$, $p(\beta_y|\theta^{\beta_y}) \propto p(y^z_c|\beta_y, z) * p(\beta_y)$ According to the conjugation:

$$p(\beta_y|\theta^{\beta_y}) \sim N(m_{\beta_y}, P_{\beta_y}):$$

$$P_{\beta_y} = \left(n_{normalzied} * \frac{zz^T}{n_{sample}} * s_y + I\right)^{-1}$$

$$m_{\beta_y} = P_{\beta_y} * P_{zy} * s_y$$

$$P_{zy} = n_{normalzied} * \frac{z * y_c^{z^T}}{n_{sample}}$$

The machine learning model component 166 may normalize $zz^T$ by $n_{normalzied}/n_{sample}$ to avoid numeric overflow for long period data, an empirical choice of value for $n_{normalzied}$ is 100.

In practice, large respond burst can be observed in the beginning period of the treatment. With the help of the effect component in the model 500, the counterfactual estimate will not likely be affected by the burst which will be shown in an example later. However, to make the model converge faster, a period of data after the treatment may be ignored. For example, the machine learning model component 166 may define $z_p=[z(0), z(1) \ldots z(T-1), z(T+offset), \ldots, z(T_{total})]$, $y^z_{cp}=[y^z_c(0), y^z_c(1) \ldots y^z_c(T-1), y^z_c(T+offset), \ldots, y^z_c(T_{total})]$, $y^z_c(t)$, where offset is the number of data points ignored after the beginning of the treatment. Accordingly the posterior conditional distribution of $\beta_y$ may be rewritten as:

$$p(\beta_y|\theta^{\beta_y}) \sim N(m_{\beta_y}, P_{\beta_y}): \quad\quad [13]$$

$$P_{\beta_y} = \left(n_{normalzied} * \frac{z_p z_p^T}{n_{sample} - offset} * s_y + I\right)^{-1}$$

$$m_{\beta_y} = P_{\beta_y} * P_{zy} * s_y$$

$$P_{zy} = n_{normalzied} * \frac{z_p * y_{cp}^{z^T}}{n_{sample} - offset}$$

The offset variable may be used in the following equations for consistency purpose.

To sample $\beta_s$, the machine learning model component 166 may define $s_p=[s(0), s(1) \ldots s(T-1), s(T+offset), \ldots, s(T_{total})]$, $s_{cp}=[y^s_c(0), y^s_c(1) \ldots y^s_c(T-1), y^s_c(T+offset), \ldots, y^s_c(T_{total})]$, where $y^s_c(t)$ is defined as follows:

$$y^s_c(t)=y(t)-\beta_z*z(t)-b \text{ for } t<T$$

$$y^s_c(t)=y(t)-\beta_z*z(t)-b-e(t) \text{ for } t \geq T \quad\quad [14]$$

The posterior conditional distribution of $\beta_s$ is given as follows:

$$p(\beta_s|\theta^{\beta_s}) \sim N(m_{\beta_s}, P_{\beta_s}):$$

$$P_{\beta_s} = \left(n_{normalzied} * \frac{S_p S_p^T}{n_{sample} - offset} * s_y + I * s_s\right)^{-1}$$

$$m_{\beta_s} = P_{\beta_s} * P_{sy} * s_y$$

$$P_{sy} = n_{normalzied} * \frac{S_p * y_{cp}^{s^T}}{n_{sample} - offset}$$

To sample b, the machine learning model component 166 may define $y^b_{cp}=[y^b_c(0), y^b_c(1) \ldots y^b_c(T-1), y^b_c(T+offset), \ldots, y^b_c(T_{total})]$, where $y^b_c(t)$ is defined as follows:

$$y^b_c(t)=y(t)-\beta_z*z(t)-\beta_s*s(t) \text{ for } t<T$$

$$y^b_c(t)=y(t)-\beta_z*z(t)-\beta_s*s(t)-e(t) \text{ for } t \geq T$$

The posterior conditional distribution of b is given as follows:

$$p(b|\theta^b) \sim N(m_b, P_b):$$

$$P_b=(n_{normalzied}*s_y+1)^{-1}$$

$$P_{by}=n_{normalzied}*sum(y^b_{cp})/(n_{sample}-offset)$$

$$m_b=P_{by}*P_b*s_y$$

To sample $e(t)$, the machine learning model component 166 may define
$e(t)=[e(0), e(1) \ldots e(t)]$ and $y^e(t)=[y^e(0), y^e(1) \ldots y^e(t)]$, $y^e(t)$ as follows:

$$y^e(t)=y(T+t)-\beta_z*z(T+t)-\beta_s*s(T+t)-b$$

$$t<=T_{total}-T$$

The machine learning model component 166 may use a Kalman smoother to sample $e(T_{total}-T)$ given $y^e(T_{total}-T)$ as a block and run Kalman filter to get $m_e(t|t)$, $P_e(t|t)$ For g(t)=1:

$$S(t) = I * s_y^{-1} + P_e(t|t-1)$$

$$K(t) = P_e(t|t-1) S(t)^{-1}$$

$$m_e(t|t) = m_e(t|t-1) + K(t) * (y^e(t) - m_e(t|t-1))$$

$$P_e(t|t) = (I - K(t)) P_e(t|t-1)$$

$$P_e(t+1|t) = P_e(t|t) + I * s_e^{-1}$$

$$m_e(t+1|t) = m_e(t|t)$$

For g(t)=0:

$$P_e(t|t) = P_e(t|t-1)$$

$$m_e(t|t) = m_e(t|t-1)$$

$$P_e(t+1|t) = P_e(t|t) + I * s_e^{-1}$$

$$m_e(t+1|t) = m_e(t|t)$$

Sample $e(T_{total}-T) \sim N(m_e(T_{total}-T|T_{total}-T), P_e(T_{total}-T|T_{total}-T))$ For $t = T_{total}-T-1, \ldots, 0$:

Use $m_e(t|t)$, $P_e(t|t)$ to calculate $\widetilde{m}_e(t|t)$, $\widetilde{P}_e(t|t)$:

$$\widetilde{P}_e(t|t) = (P_e(t|t)^{-1} + I * s_e)^{-1}$$

$$\widetilde{m}_e(t|t) = \widetilde{P}_e(t|t) * (P_e(t|t)^{-1} * m_e(t|t) + e(t+1) * s_e) \quad [20]$$

Sample $e(t) \sim N(\widetilde{m}_e(t|t), \widetilde{P}_e(t|t))$

In practice, the cumulative effect may be more important than the point-wise effect e(t). The machine learning model component 166 may sample the cumulative effect $e_c(t)$ after e(t) is sampled: $e_c(t) = \Sigma_{i=0}^{t} e(i)$ The machine learning model component 166 may sample the precisions of the normal distributions: $s_x$, $s_y$, $s_u$, $s_e$, $s_s$, according to the conjugate priors of the gamma distribution:

To sample $s_x$:

$$k_x^* = k_x + 0.5 * n_{sample} * n_x$$

$$v_x^* = v_x + 0.5 * \sum_{i=1}^{n_x} \sum_{t=0}^{T_{total}} (x_i(t) - \beta_{x_i} * z(t))^2$$

$$s_x \sim G(k_x^*, v_x^*)$$

To sample $s_y$:

$$k_y^* = k_y + 0.5 * (n_{sample} - \text{offset})$$

$$v_y^* = v_y + 0.5 * \Sigma_{t=0}^{T-1}(y(t)-b-\beta_y z(t))^2 + \Sigma_{t=T+offset}^{T_{total}}(y(t)-b-\beta_y z(t)-e(t-T))^2$$

$$s_y \sim G(k_y^*, v_y^*)$$

To sample $s_u$:

$$k_u^* = k_u + 0.5 * (n_{sample} - 1) * n_u$$

$$v_u^* = v_u + 0.5 * \sum_{i=1}^{n_u} \sum_{L=1}^{T_{total}} (u_i(t) - u_i(t-1))^2$$

$$s_u \sim G(k_u^*, v_u^*)$$

To sample $s_e$:

$$k_e^* = k_e + 0.5 * ((n_{sample} - T - 1))$$

$$v_e^* = v_e + 0.5 * \sum_{t=1}^{T_{total}-T} (e(t) - e(t-1))^2$$

$$s_e \sim G(k_e^*, v_e^*)$$

To sample $s_s$:

$$k_s^* = k_s + 0.5 * n_s$$

$$v_s^* = v_s + 0.5 * \|\beta_s\|$$

$$s_s \sim G(k_s^*, v_s^*)$$

To sample g(t), the machine learning model component 166 may assume that g(t) is a Markov chain, with prior distribution: $P(g(0)=1)=\pi_0$ and a transition matrix T. For model simplicity, the machine learning model component 166 may assume a symmetric transition matrix which means:

$$P(g(t)=1|g(t-1)=0) = P(g(t)=0|g(t-1)=1) = \alpha$$

$$P(g(t)=1|g(t-1)=1) = P(g(t)=0|g(t-1)=0) = 1-\alpha$$

With $r(t) = p(y(t)|g(t)=0)/p(y(t)|g(t)=1)$, the forward posterior distribution of g(t) given $Y(t) = [y(0) \ldots y(t)]$ is as below:

$$p(g(0)|Y(0)) = \frac{\pi_0}{\pi_0 + (1-\pi_0)r(t)} * g(0) + \frac{(1-\pi_0)r(t)}{\pi_0 + (1-\pi_0)r(t)} * (1-g(0))$$

$$p(g(t)|Y(t)) = \frac{\pi_t}{\pi_t + (1-\pi_t)r(t)} * g(t) + \frac{(1-\pi_t)r(t)}{\pi_t + (1-\pi_t)r(t)} * (1-g(t))$$

$$\pi_t = P(g(t-1)|Y(t-1)) * (1-\alpha) + (1 - P(g(t-1)|Y(t-1))) * \alpha$$

The joint posterior distribution of $[g(0) \ldots g(T_{total})]$ given Y(t) can be written in the backward manner:

$$p(g(0),g(1) \ldots g(T_{total})|Y(t)) = p(g(T_{total})|Y(t)) * P(g(T_{total}-1)|Y(t),g(T_{total})) * \ldots * p((g(0)|Y(t), g(1) \ldots g(T_{total})))$$

By defining denote $G(t) = [g(t+1), g(t+2) \ldots g(T_{total})]$, the machine learning model component 166 may can rewrite the joint distribution as:

$$p(g(0),g(1) \ldots g(T_{total})|Y(t)) = p(g(T_{total})|Y(T_{total})) * \Pi_{t=0}^{T_{total}-1} p(g(t)|Y(t),G(t)) \quad [30]$$

According to the D-separation of a Bayesian network, $$p(g(t)|Y(T_{total}),G(t)) = p(g(t)|Y(t),g(t+1))$$

From the Bayesian rule, $$p(g(t)|Y(t),g(t+1)) = p(g(t)|Y(t)) * P(g(t+1)|Y(t),g(t))/p(g(t+1)|Y(t))$$

$$p(g(t+1)|Y(t)) = P(g(t)=1|Y(t)) * p(g(t+1)|Y(t),g(t)=1) + P(g(t)=0|Y(t)) * p(g(t+1)|Y(t),g(t)=0)$$

According to the Markov Chain Property $$p(g(t+1)|Y(t),g(t)=1) = p(g(t+1)|g(t)=1) = (1-g(t+1)) * \alpha + g(t+1) * (1-\alpha)$$

$$p(g(t+1)|Y(t),g(t)=0) = p(g(t+1)|g(t)=1) = (1-g(t+1)) * (1-\alpha) + g(t+1) * \alpha$$

Combining the above equations, $$p(g(t)|Y(T_{total}), G(t)) = \frac{P_1}{P_1+P_2}*g(t) + \frac{P_2}{P_1+P_2}*(1-g(t))$$

Where $$P_1 = P(g(t)1|Y(t))*((1-g(t+1))*\alpha + g(t+1)*(1-\alpha))$$
$$= \frac{\pi_t}{\pi_t + (1-\pi_t)r(t)} * ((1-g(t+1))*\alpha + g(t+1)*(1-\alpha))$$

$$P_2 = P(g(t)=0|y(t))*((1-g(t+1))*(1-\alpha) + g(t+1)*\alpha)$$
$$= \frac{(1-\pi_c)r(t)}{\pi_c + (1-\pi_c)r(t)} * ((1-g(t+1))*\alpha + g(t+1)*(1-\alpha))$$

Therefore, the machine learning model component 166 may sample g(t) in a backward order:
1. First sample $g(T_{total})$ according to $p(g(T_{total})|Y(T_{total}))$
2. Sample g(t) according to $p(g(t)|Y(T_{total}), G(t))$ for $t=T_{total}-1 \ldots 0$ The machine learning model component 166 may calculate r(t). The likelihood of y(t) given g(t)=1 is well defined:

$$p(y(t)|g(t)=1) = N(\beta_y*z(t)+\beta_s*s(t)+b, s_y^{-1})$$
for $t<T$ $$p(y(t)|g(t)=1) = N(\beta_y*z(t)+\beta_s*s(t)+b+e(t), s_y^{-1})$$
for $t>=T$ The likelihood of y(t) given g(t)=0 is less straightforward. As the underlying distribution of the unknown mechanism by which the noisy g(t) is generated at time t is unknown, the model can't assume y(t) at different times follow an identical distribution, e.g. a norm distribution. Instead, the machine learning model component 166 may assume each y(t) follows a norm distribution centered at some point c(t) with the variance $s_y^{-1}$. The machine learning model component 166 may further assume that $\|c(t)-y(t)\|=\lambda s_y^{-1}$, therefore, the likelihood of y(t) given g(t)=0 is a constant:

$$p(y(t)|g(t)=0) = \exp\left(-\frac{\lambda}{2}\right) / \sqrt{2\pi*s_y^{-1}}$$

Accordingly, r(t) can be calculated as:

$$r(t) = \exp(\frac{1}{2}(\|\beta_y*z(t)+\beta_s*s(t)+b\|*s_y-\lambda)) \text{ for } t<T$$

$$r(t) = \exp(\frac{1}{2}(\|\beta_y*z(t)+\beta_s*s(t)+b+e(t)\|*s_y-\lambda)) \text{ for } t>=T$$

In the above equation, $\lambda$ controls the posterior probability of g(t). A large $\lambda$ means the model will more likely to accept the observed samples at time t, while a small $\lambda$ means the model will more likely to reject observed samples at t.

Figure 6:
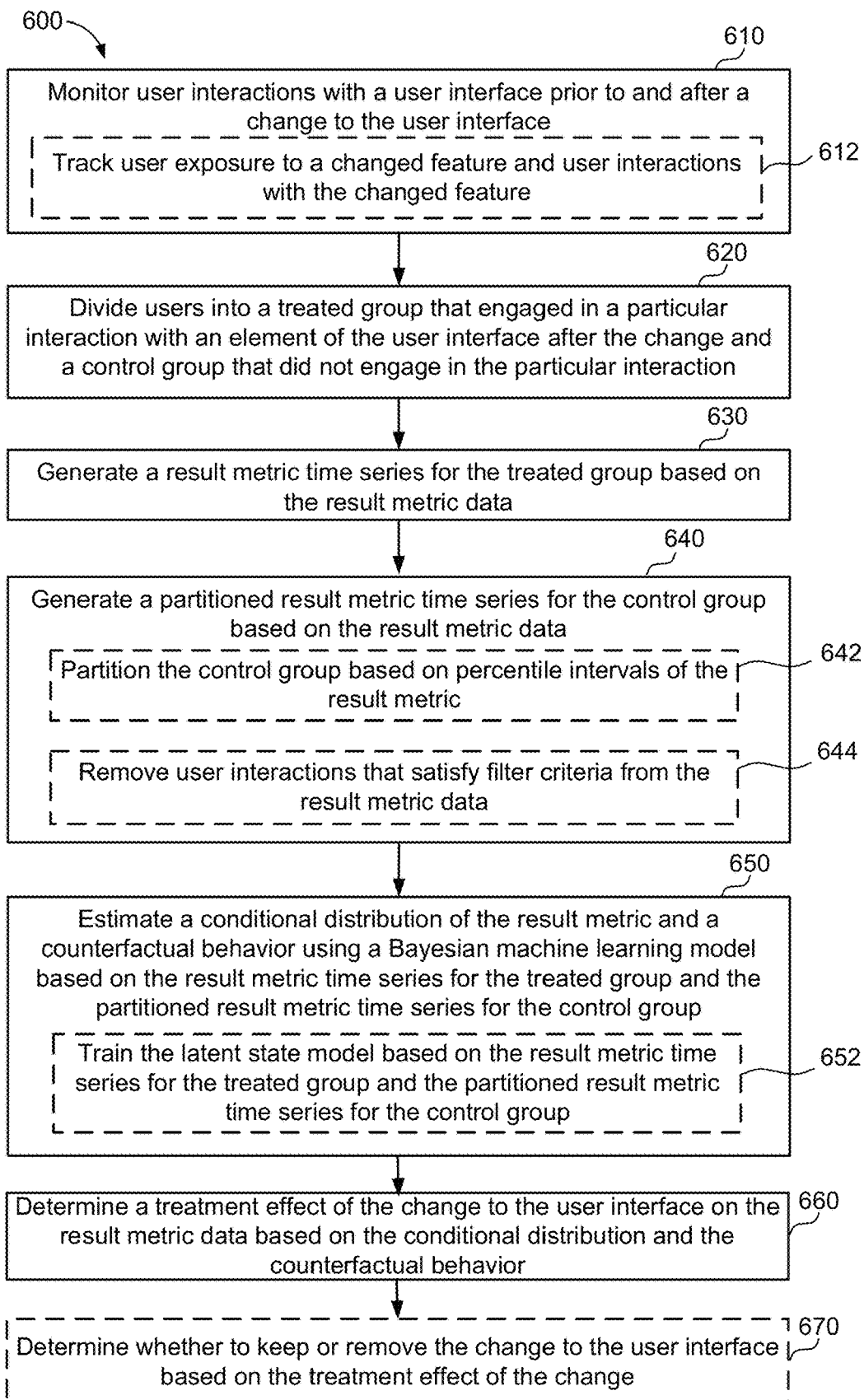
FIG. 6 is a flowchart of an example method of for evaluating a user interface, in accordance with an implementation of the present disclosure.

Turning to FIG. 6, an example method 600 estimates a treatment effect of a change to a user interface. For example, method 600 may be performed by the user interface evaluation application 150 on the computer device 110.

At block 610, the method 600 may include monitoring user interactions with a user interface prior to and after a change to the user interface. For instance, in an implementation, the user interface 152 and/or the monitoring instrumentation 154 may monitor user interactions with the user interface 152 or the local user interface 172 prior to and after a change to the user interface. For example, the local instrumentation 174 of local user interface 172 may report locally collected user interactions to the monitoring instrumentation 154. At sub-block 612, the block 610 may include tracking user exposure to a changed feature and user interactions with the changed feature. For example, the user interface 152 may track the user exposure to the changed feature and user interactions with the changed feature via monitoring instrumentation 154 and/or local instrumentation 174. For instance, the user interface 152, monitoring instrumentation 154, and/or local instrumentation 174 may record a time or date at which the change to the user interface is first presented to the user (e.g., rendered on a display of the user device 170). The user interface 152, monitoring instrumentation 154, and/or local instrumentation 174 may also record each event where the user interacts with the change to the user interface (e.g., by clicking on, hovering over, or otherwise engaging a feature including the change).

At block 620, the method 600 may include dividing users into a treated group that engaged in a particular interaction with an element of the user interface after the change and a control group that did not engage in the particular interaction. For instance, in an implementation, the group component 162 may divide users into a treated group that engaged in a particular interaction with an element of the user interface after the change and a control group that did not engage in the particular interaction. For example, the group component 162 may determine whether each user engaged in the particular interaction. In an implementation, the groups may be divided into cohorts based on when a user first engaged in the particular interaction.

At block 630, the method 600 may include generating a result metric time series for the treated group based on the result metric data. For instance, in an implementation, the time series component 164 may generate a result metric time series (e.g., time series 210, 310) for the treated group based on the result metric data. The result metric data for the treated group may be aggregated. The time series may include an interaction amount for each day. The interaction amount may be associated with one or more product categories.

At block 640, the method 600 may include generating a partitioned result metric time series for the control group based on the result metric data. In an implementation, for instance, the time series component 164 may generate the partitioned result metric time series for the control group based on the result metric data. In sub-block 642, for example, the block 640 may include partitioning the control group based on percentile intervals of the result metric. That is, the time series component 164 may partition the control group based on percentile intervals of the result metric. Each percentile interval may be referred to as a bucket. Generally, users grouped into the same bucket may have similar spending patterns, which differ from users in other buckets. Filters may be applied to the buckets to remove buckets with abnormal data. For example, buckets dominated by several large activity days (e.g., due to holidays, events, or sales) may be considered outliers. For example, at sub-block 644 the block 640 may include removing user interactions that satisfy filter criteria from the result metric data. For instance, the time series component 164 may remove the user interactions that satisfy filter criteria from the result metric data.

At block 650, the method 600 may include estimating a conditional distribution of the result metric and a counterfactual behavior using a Bayesian machine learning model based on the result metric time series for the treated group and the partitioned result metric time series for the control group. In an implementation, for example, the machine learning model component 166 may estimate a conditional distribution of the result metric and a counterfactual behavior (e.g., counterfactual behavior 350) using a Bayesian machine learning model (e.g., model 400 or model 500)

based on the result metric time series for the treated group and the partitioned result metric time series for the control group. The counterfactual behavior based on the Bayesian machine learning model may be more accurate than previous approaches that rely only on pre-treatment trends. For instance, approaches that rely only on pre-treatment trends may artificially increase a weight of events immediately before the change to the user interface, thereby skewing the results based on a small number of samples. In contrast, by modeling the counterfactual behavior based on the result metric time series for the treated group and the partitioned result metric time series for the control group, the counterfactual behavior may more accurately model user behavior with respect to the changed user interface. In sub-block 652, the block 650 may include training the latent state model based on the result metric time series for the treated group and the partitioned result metric time series for the control group. For instance, the machine learning model component 166 may train the latent state model 500 based on the result metric time series for the treated group and the partitioned result metric time series for the control group. Further details of training the latent state model are described below with respect to FIG. 7.

In block 660, the method 600 may include determining a treatment effect of the change to the user interface on the result metric data based on the conditional distribution and the counterfactual behavior. In an implementation, for instance, the effect quantization component 168 may determine the treatment effect (e.g., pointwise lift 260) of the change to the user interface on the result metric data based on the conditional distribution and the counterfactual behavior.

In block 670, the method 600 may include determining whether to keep or remove the change to the user interface based on the treatment effect of the change. In an implementation, for instance, the interface optimization module 160 may determine whether to keep or remove the change to the user interface based on the treatment effect of the change. For example, the interface optimization module 160 may compare the treatment effect of the change to a threshold. In one implementation, the threshold may be 0 and the interface optimization module 160 may keep changes that result in a positive treatment effect and remove changes that result in a negative treatment effect. The interface optimization module 160 may update the user interface 152 and/or local user interface 172 based on the determination. For example, the interface optimization module 160 may automatically remove a feature that results in a negative treatment effect. For instance, the interface optimization module 160 may revert to a previous version of the user interface 172 that does not include the change to the user interface. In an implementation, the interface optimization module 160 may provide an update to an application or web page providing the user interface.

Figure 7:
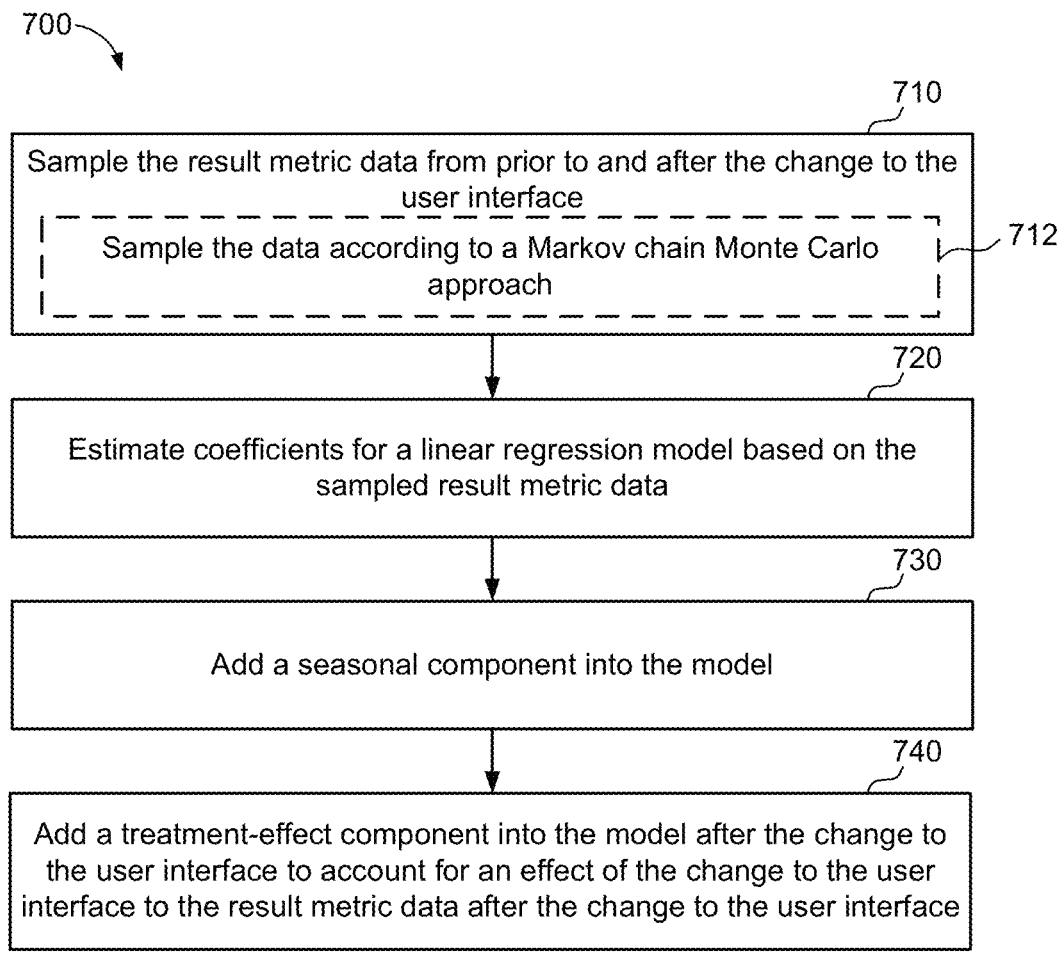
FIG. 7 is a flowchart of an example method of training a machine learning model, in accordance with an implementation of the present disclosure

Referring now to FIG. 7, an example method 700 trains a machine learning model to estimate a treatment effect. For example, method 700 may be performed by the user interface evaluation application 150 and/or the machine learning model component 166 on the computer device 110. The method 700 may correspond to sub-block 652 of the method 600.

At block 710, the method 700 may include sampling the result metric data from prior to and after the change to the user interface. For example, the machine learning model component 166 may sample the result metric data from prior to and after the change (e.g., at time 230 or time 330) to the user interface. In sub-block 712 the block 710 may include sampling the data according to a Markov chain Monte Carlo approach. For example, the machine learning model component 166 may sample the data according to a Markov chain Monte Carlo approach. Specific techniques for sampling the result metric data according to the model 500 using the Markov chain Monte Carlo approach are discussed above regarding FIG. 5.

At block 720, the method 700 may include estimating coefficients for a linear regression model based on the sampled result metric data. For example, the machine learning model component 166 may estimate the coefficients for the linear regression model based on the sampled result metric data. The linear regression model may form a portion of the model 400 or model 500. For example, the latent state Z 410, the known times series 420a-420n, and the post-treatment result Y 450 of model 400 may be considered a linear regression model. In the model 500, a linear regression model may include the latent state Z 510, the time series X 520, and the result Y 550.

At block 730, the method 700 may include adding a seasonal component to the model. For example, the machine learning model component 166 may add the seasonal component S 430 to the model 400 or add the seasonal component s(t) to the model 500. The seasonal component s(t) may be observed. The regression coefficients of s(t) may be estimated using an MCMC method described above to sample $\beta_s$. The machine learning model component 166 may also sample the seasonal component as described above with respect to FIG. 5.

At block 740, the method 700 may include adding a treatment-effect component into the model after the change to the user interface to account for an effect of the change to the user interface to the result metric data after the change to the user interface. In an aspect, for example, the machine learning model component 166 may add the treatment effect component E 440 to the model 400 or add the effect component 540 to the model 500. Accordingly, the machine learning model component 166 may train a Bayesian machine learning model that may be used to estimate treatment effect.

Figure 8:
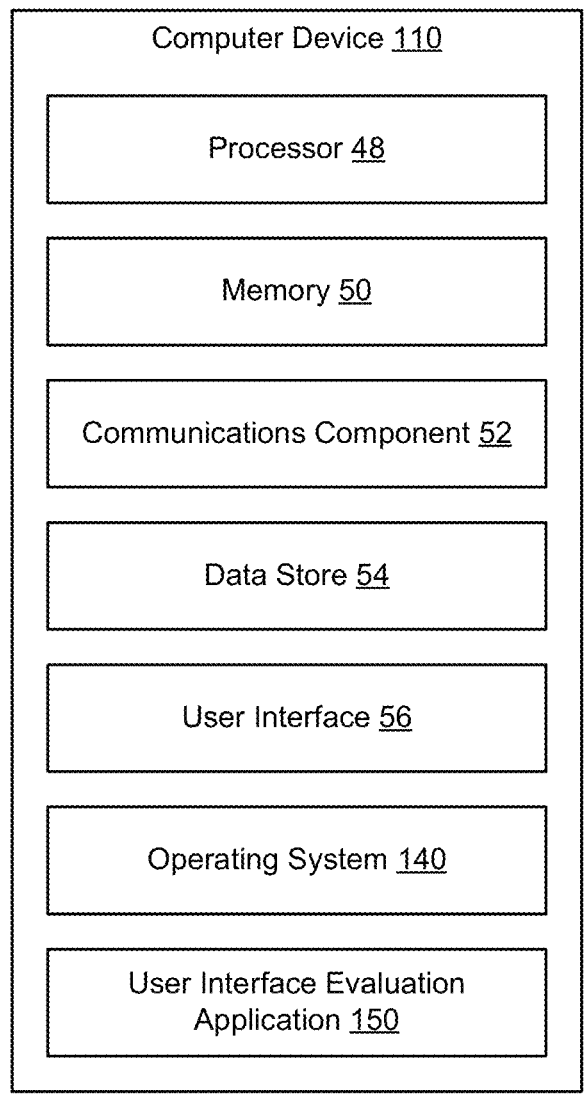
FIG. 8 is a schematic block diagram of an example computer device, in accordance with an implementation of the present disclosure.

Referring now to FIG. 8, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116. The memory 50 may include instructions for executing the user interface evaluation application 150.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or applications 130. In addition, processor 48 may execute operating system 140 and/or applications 130, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device for evaluating a user interface, comprising:
    memory; and
    a processing system comprising at least one processor communicatively coupled with the memory and configured to:
        monitor user interactions with a user interface prior to and after a change to the user interface, the monitoring including collecting result metric data per user as a time series;
        divide users into a treated group that engaged in a particular interaction with an element of the user interface after the change and a control group that did not engage in the particular interaction;
        generate a result metric time series for the treated group based on the result metric data;
        generate a partitioned result metric time series for the control group based on the result metric data;
        estimate a conditional distribution of the result metric and a counterfactual behavior using a machine learning model based on the result metric time series for the treated group and the partitioned result metric time series for the control group;
        determine a treatment effect of the change to the user interface on the result metric data based on the conditional distribution and the counterfactual behavior; and
        update the user interface to keep or remove the change to the user interface based on the treatment effect of the change.

2. The computer device of claim 1, wherein the processor is configured to track user exposure to a changed feature and user interactions with the changed feature.

3. The computer device of claim 1, wherein the result metric data includes a user identifier, a date, and an interaction amount for each user interaction of a plurality of user interactions.

4. The computer device of claim 3, wherein the result metric data includes a product category associated with each user interaction of the plurality of user interactions.

5. The computer device of claim 1, wherein the processor is configured to partition the control group based on percentile intervals of the result metric.

6. The computer device of claim 5, wherein the processor is configured to remove user interactions that satisfy filter criteria from the result metric data.

7. The computer device of claim 6, wherein the filter criteria generate a gate signal indicating whether to include the result metric data associated with a user interaction in the partitioned result metric time series.

8. The computer device of claim 1, wherein the machine learning model is a latent state model, wherein the processor is configured to train the latent state model based on the result metric time series for the treated group and the partitioned result metric time series for the control group.

9. The computer device of claim 8, wherein the processor is configured to:
    sample the result metric data from prior to and after the change to the user interface;
    estimate coefficients for a linear regression model based on the sampled result metric data; and
    add a treatment-effect component into the model after the change to the user interface to account for an effect of the change to the user interface to the result metric data after the change to the user interface.

10. The computer device of claim 9, wherein the processor is configured to sample the result metric data according to a Markov chain Monte Carlo approach.

11. The computer device of claim 9, wherein the processor is configured to add a seasonal component into the model.

12. A method of estimating change in user behavior due to user interface enhancements, comprising:
    monitoring user interactions with a user interface prior to and after a change to the user interface, the monitoring including collecting result metric data per user as a time series;
    dividing users into a treated group that engaged in a particular interaction with an element of the user interface after the change and a control group that did not engage in the particular interaction;
    generating a result metric time series for the treated group based on the result metric data;
    generating a partitioned result metric time series for the control group based on the result metric data;
    estimating a conditional distribution of the result metric and a counterfactual behavior using a machine learning model based on the result metric time series for the treated group and the partitioned result metric time series for the control group;
    determining a treatment effect of the change to the user interface on the result metric data based on the conditional distribution and the counterfactual behavior; and
    updating the user interface to keep or remove the change to the user interface based on the treatment effect of the change.

13. The method of claim 12, wherein the monitoring includes tracking user exposure to a changed feature and user interactions with the changed feature.

14. The method of claim 12, wherein the result metric data includes a user identifier, a date, and an interaction amount for each user interaction of a plurality of user interactions.

15. The method of claim 12, wherein generating the partitioned result metric time series comprises partitioning the control group based on percentile intervals of the result metric.

16. The method of claim 15, wherein generating the partitioned result metric time series comprises removing user interactions that satisfy filter criteria from the result metric data.

17. The method of claim 12, wherein the machine learning model is a latent state model, the method further comprising training the latent state model based on the result metric time series for the treated group and the partitioned result metric time series for the control group.

18. The method of claim 17, wherein training the model comprises:
    sampling the result metric data from prior to and after the change to the user interface;
    estimating coefficients for a linear regression model based on the sampled result metric data; and
    adding a treatment-effect component into the model after the change to the user interface to account for an effect of the change to the user interface to the result metric data after the change to the user interface.

19. The method of claim 12, further comprising adding a seasonal component into the model.

20. A computer-readable medium storing computer-executable code for evaluating a change to a user interface, the computer-readable medium storing code to:
- monitor user interactions with the user interface prior to and after a change to the user interface, the monitoring including collecting result metric data per user as a time series;
- divide users into a treated group that engaged in a particular interaction with an element of the user interface after the change and a control group that did not engage in the particular interaction;
- generate a result metric time series for the treated group based on the result metric data;
- generate a partitioned result metric time series for the control group based on the result metric data;
- estimate a conditional distribution of the result metric and a counterfactual behavior using a machine learning model based on the result metric time series for the treated group and the partitioned result metric time series for the control group;
- determine a treatment effect of the change to the user interface on the result metric data based on the conditional distribution and the counterfactual behavior; and
- update the user interface to keep or remove the change to the user interface based on the treatment effect of the change.

* * * * *